(12) United States Patent
Huprikar et al.

(10) Patent No.: US 7,364,680 B2
(45) Date of Patent: Apr. 29, 2008

(54) METHOD OF MANUFACTURING A PLURALITY OF COMMON COMPONENTS

(75) Inventors: Anand Huprikar, Novi, MI (US); Albert Langen, Canton, MI (US)

(73) Assignee: BASF Corporation, Florham Park, NJ (US)

(*) Notice: Subject to any disclaimer, the term of this patent is extended or adjusted under 35 U.S.C. 154(b) by 396 days.

(21) Appl. No.: 11/125,366

(22) Filed: May 9, 2005

(65) Prior Publication Data

US 2006/0251857 A1    Nov. 9, 2006

(51) Int. Cl.
*B29C 45/00*    (2006.01)

(52) U.S. Cl. .................. 264/159; 264/318; 264/328.1; 425/DIG. 47

(58) Field of Classification Search ...................... None
See application file for complete search history.

(56) References Cited

U.S. PATENT DOCUMENTS

| | | | |
|---|---|---|---|
| 335,935 A | 2/1886 | Kipper | |
| 1,576,184 A | 3/1926 | Freeman | |
| 1,630,262 A | 5/1927 | Fraser | |
| 2,945,263 A | 7/1960 | Leistensnider | |
| 3,251,914 A * | 5/1966 | Kesling | ...................... 264/573 |
| 3,265,795 A | 8/1966 | Medney | |
| 3,618,180 A | 11/1971 | Rogers | |
| 4,420,450 A | 12/1983 | Marsh | |
| 4,478,396 A | 10/1984 | Kawaura | |
| 4,499,611 A | 2/1985 | Davis | |
| 4,981,637 A | 1/1991 | Hyer | |
| 5,032,335 A | 7/1991 | Wilson | |
| 5,045,255 A | 9/1991 | Kurz | |
| 5,118,276 A | 6/1992 | Hashimoto | |
| 5,262,115 A * | 11/1993 | Tomlinson | .................. 264/265 |
| 6,676,880 B1 | 1/2004 | Lineton | |
| 2005/0073166 A1 | 4/2005 | Snyder | |

* cited by examiner

*Primary Examiner*—Edmund H. Lee
(74) *Attorney, Agent, or Firm*—Fernando A. Borrego

(57) ABSTRACT

A method of forming a plurality of components comprising the steps of: closing a pair of mold halves to define a mold chamber; filling the mold chamber with a material about an armature; curing the material within the mold chamber to create a stack of material; moving a mold half to open the mold chamber; removing the armature from the stack of material to define a cavity disposed within the stack of material and at least one opening disposed in an exterior surface; and cutting the stack of material through the cavity to form at least two components with each of the components having a common configuration.

19 Claims, 8 Drawing Sheets

METHOD OF MANUFACTURING A PLURALITY OF COMMON COMPONENTS

BACKGROUND OF THE INVENTION

1. Field of the Invention

The subject invention relates to a stack of material that can be cut to form a plurality of common components and an associated method of manufacturing the stack of material.

2. Description of Related Art

Molding apparatuses for forming a stack of material that can be subsequently cut to form a plurality of common components is known to those skilled in the art. In particular, U.S. Pat. Nos. 335,935 and 2,945,263 disclose molding apparatuses for manufacturing a stack of interconnected O-rings. The O-rings are subsequently cut to form a plurality of commonly configured O-rings. U.S. Pat. No. 1,576,184 discloses a similar molding apparatus for forming a stack of rubber gaskets, which are subsequently cut. These types of molding processes are advantageous because a large number of components can be simultaneously manufactured.

The prior art apparatuses and associated methods, however, are limited in their application. The known apparatuses and methods require that the stack have a continuous exterior surface, which restricts the types of components that can be made. Further, the components must be of a relatively simple configuration.

Accordingly, it would be desirable to develop a method of manufacture that includes the advantages of forming a plurality of components simultaneously while creating greater flexibility in the types and configurations of the components being made.

SUMMARY OF THE INVENTION AND ADVANTAGES

The subject invention includes a stack of material formed of a malleable composition in a single molding process. The stack of material comprises a first portion having a first base and at least one first extension extending from the first base. A second portion has a second base complementary in configuration with the first base and abuts the first base. The second portion also has at least one second extension extending from the second base with the second extension being complementary in configuration with the first extension. A third portion has a third base complementary in configuration with the first base and at least one third extension extending from the third base with the third extension being complementary in configuration with the first extension. The third extension abuts the first extension to define a stack of material wherein the stack of material can be cut to transform the first, second, and third portions into first, second, and third components having a common configuration.

The subject invention also includes an associated method of simultaneously forming a plurality of components utilizing a molding assembly having an inner core, a first mold half, and a second mold half with at least one of the mold halves including at least one armature. The method comprises the steps of: closing the mold halves about the inner core to encapsulate the inner core and define a mold chamber; filling the mold chamber with a material about the armature which at least partially encapsulates the armature; curing the material within the mold chamber to create a stack of material having an exterior surface; moving at least one of the mold halves relative to the inner core to open the mold chamber; removing the armature from the stack of material to define a cavity disposed within the stack of material and at least one opening disposed in the exterior surface; and cutting the stack of material through the cavity to form at least two components with each of the components having a common configuration.

Accordingly, the subject invention discloses a stack of material having a discontinuous exterior surface and an associated method of manufacturing the stack of material. The subject invention can simultaneously form a plurality of relatively complex configured components, which define the stack of material. The stack of material is then cut to transform the stack into a number of components having a common configuration. The subject invention creates greater flexibility in the types and configurations of the components that can be made by this type of manufacturing process.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE INVENTION

Figure 1:
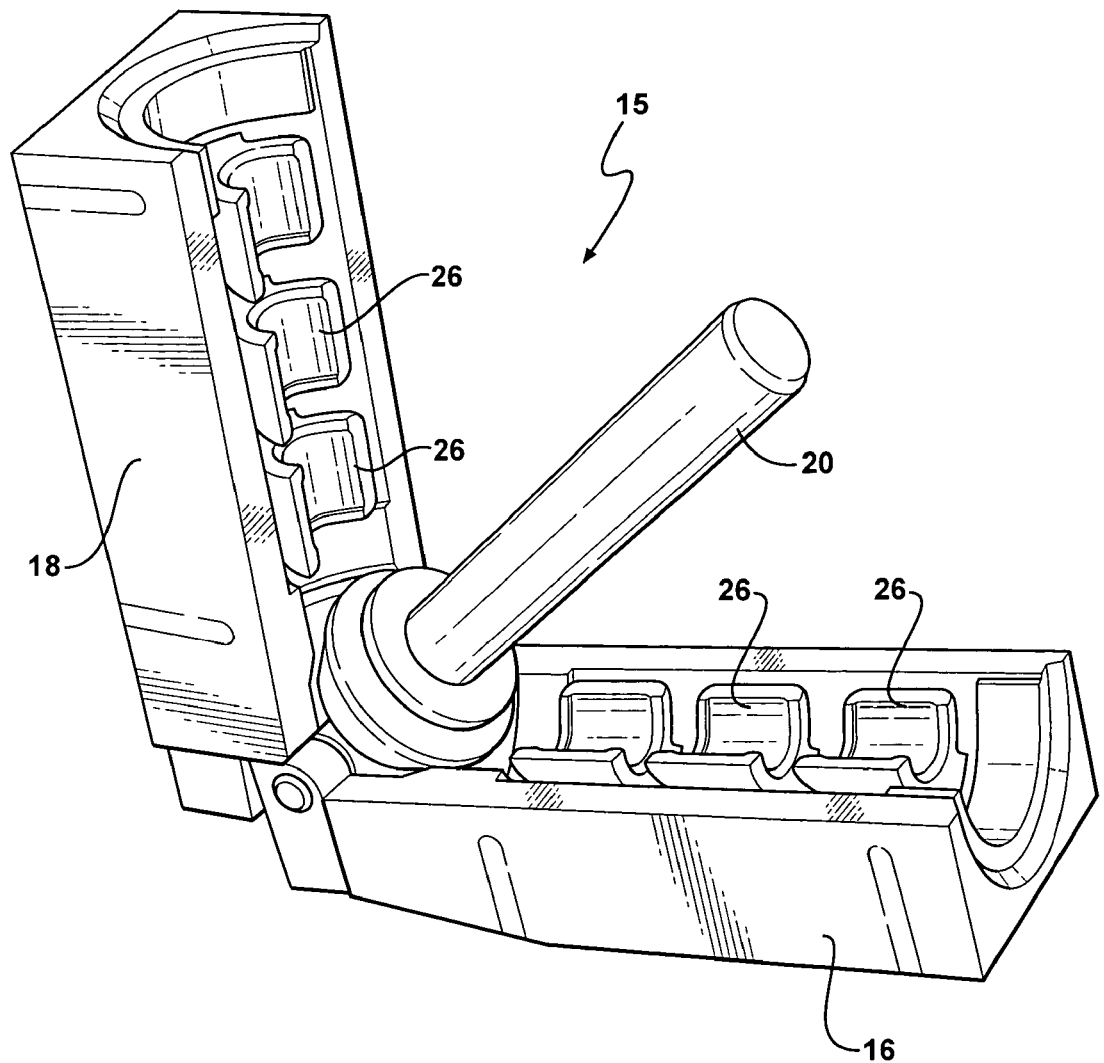
FIG. 1 is a perspective view of a portion of a molding assembly in an open position.
Figure 2:
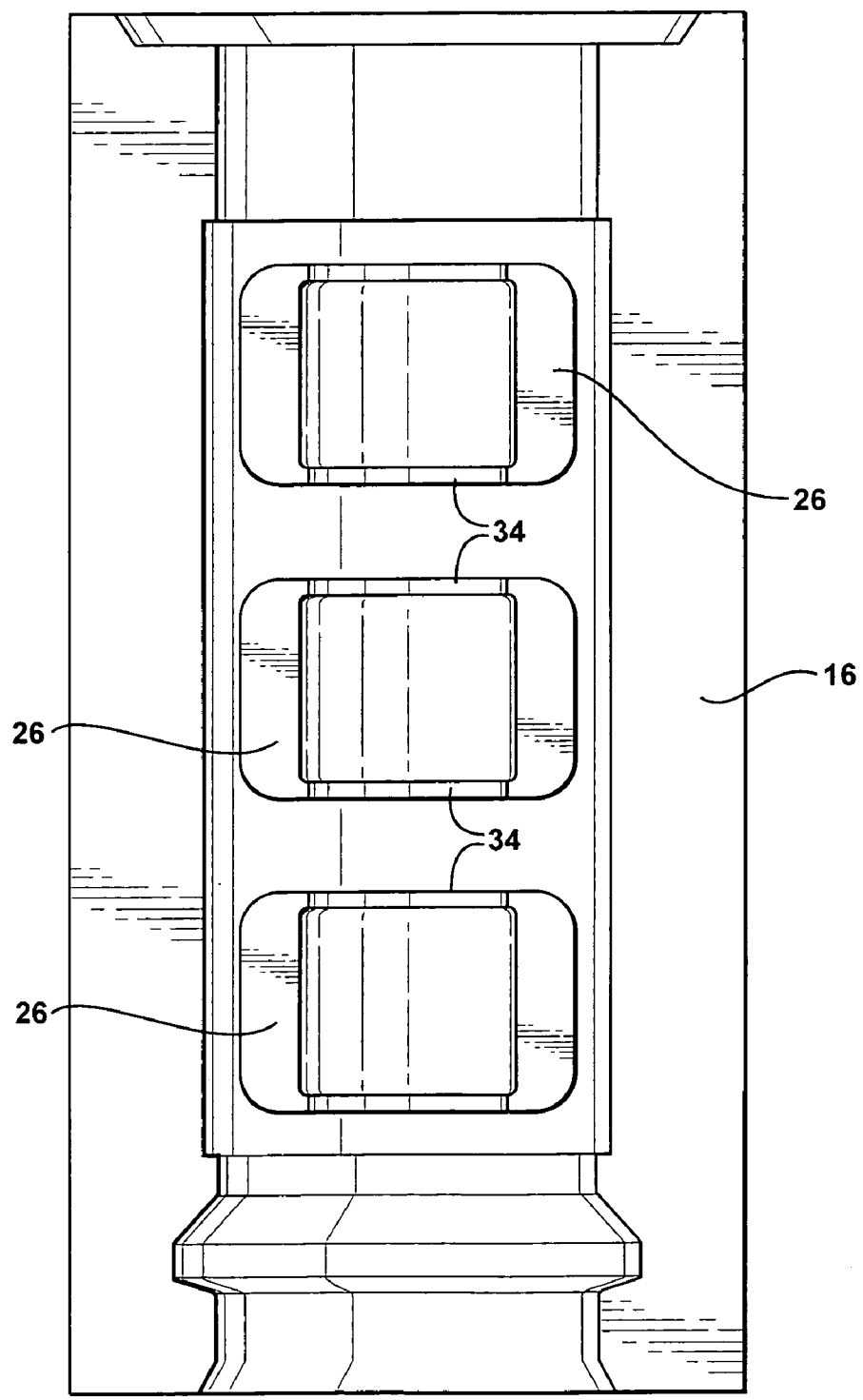
FIG. 2 is an elevational view of a mold half of the molding assembly.
Figure 3:
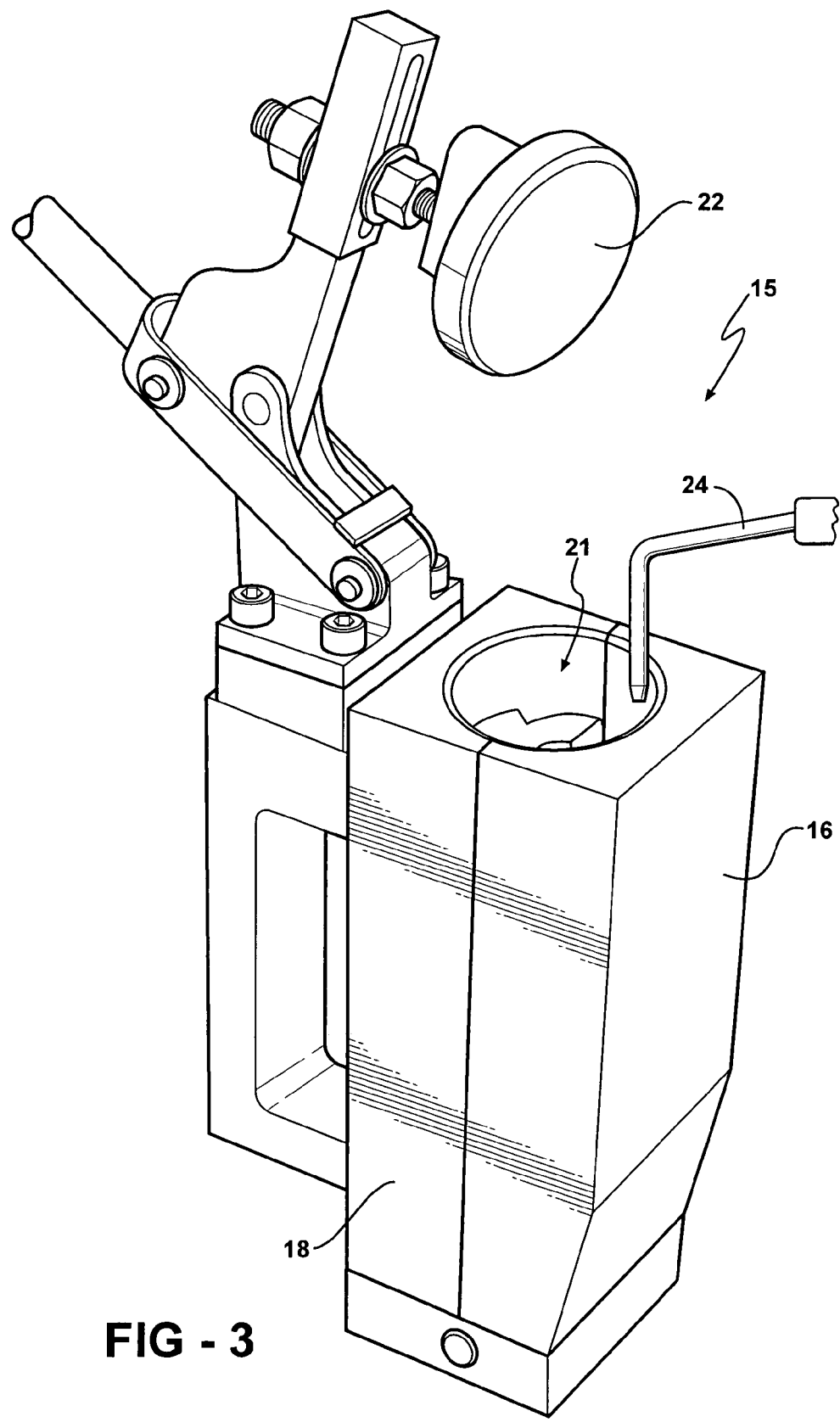
FIG. 3 is a perspective view of the molding assembly in a closed position.

Referring to the Figures, wherein like numerals indicate like or corresponding parts throughout the several views, a molding assembly is generally shown at 15 in FIGS. 1-3. The molding assembly 15 includes a first mold half 16 and a second mold half 18. An inner core 20 is disposed between the first 16 and second 18 mold halves. The inner core 20 is preferably circular and defines a central axis between the mold halves 16, 18. At least one of the mold halves 16, 18 is movable along an operational axis substantially transverse to the central axis. As such, the mold halves 16, 18 can move between an open position exposing the core 20 and a closed position encapsulating the core 20 and defining a mold chamber 21. In the embodiment illustrated, the first mold half 16 is pivotally mounted to the second mold half 18 such that the first mold half 16 can pivot relative to the second mold half 18 when the first mold half 16 moves between the open and closed positions. The inner core 20 is also pivotally connected to the mold halves 16, 18. Hence, the inner core 20 also pivots relative to the first 16 and second 18 mold halves when the first mold half 16 moves between the open and closed positions. As shown in FIG. 3, the molding assembly 15 includes a lid 22, an injector 24, and various other components. This type and configuration of molding assembly 15 is known to those skilled in the art and with therefore not be discussed in any greater detail. It should be appreciated that the molding assembly 15 may be of a different type or configuration without deviating from the scope of the subject invention. In fact, the mold halves 16, 18 could move laterally relative to each other.

Figure 6:
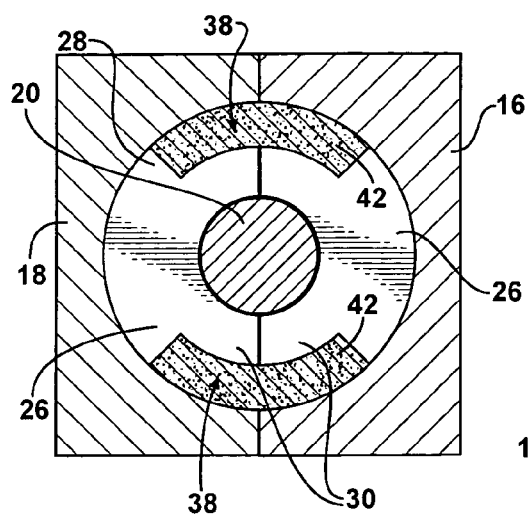
FIG. 6 is a cross-sectional view taken along line 6-6 of FIG. 5 with the molding assembly in the closed position.
Figure 7:
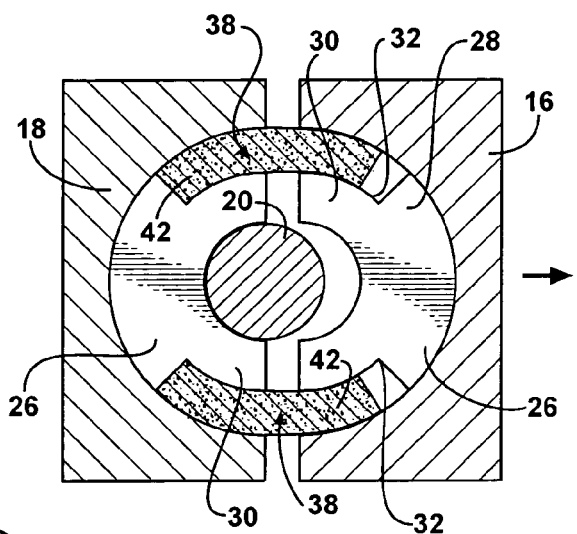
FIG. 7 is a cross-sectional view of the molding assembly similar to the cross-sectional view of FIG. 6 with the molding assembly in a partially open position.
Figure 8:
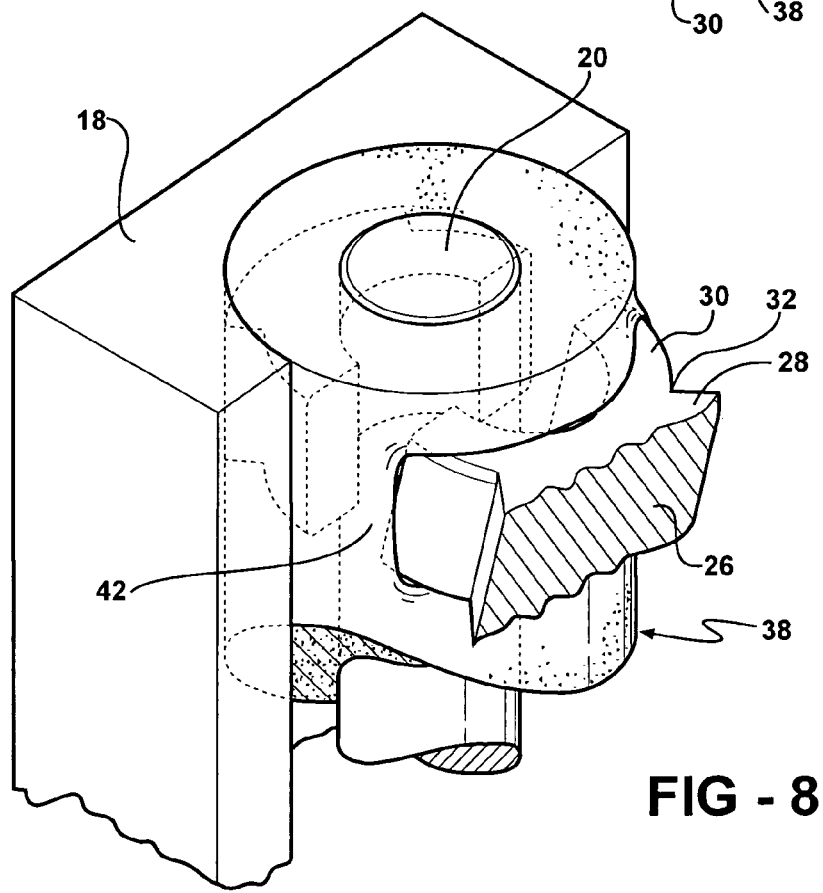
FIG. 8 is a fragmented perspective view of the molding assembly in the partially open position.

At least one of the mold halves 16, 18 includes at least one armature 26. Preferably, each mold half 16, 18 includes a corresponding armature 26. Even more preferably, each mold half 16, 18 includes a plurality of corresponding armatures 26. As illustrated, both of the first 16 and second 18 mold halves include three separate armatures 26. As also shown in FIGS. 6-8, each of the armatures 26 includes a neck portion 28 and an enlarged portion 30 which defines a pocket 32 within the mold chamber 21. The neck portion 28 connects the armature 26 to the associated mold half 16, 18 and the enlarged portion 30 extends into the mold chamber 21. The pocket 32 is formed at the juncture of the neck 28 and enlarged 30 portions. In essence, the pocket 32 is a section of the mold chamber 21 captured by both the neck 28 and enlarged 30 portions. The enlarged portion 30 may be of any suitable configuration as desired. In the illustrated embodiment, the enlarged portion 30 has an arcuate or C-shaped configuration. As shown best in FIGS. 1-2 and 4-5, each of the enlarged portions 30 of the armatures 26 can include a ridge 34 at a top and bottom thereof. The ridges 34 contact the inner core 20 when the molding assembly 15 is in the closed position.

Figure 4:
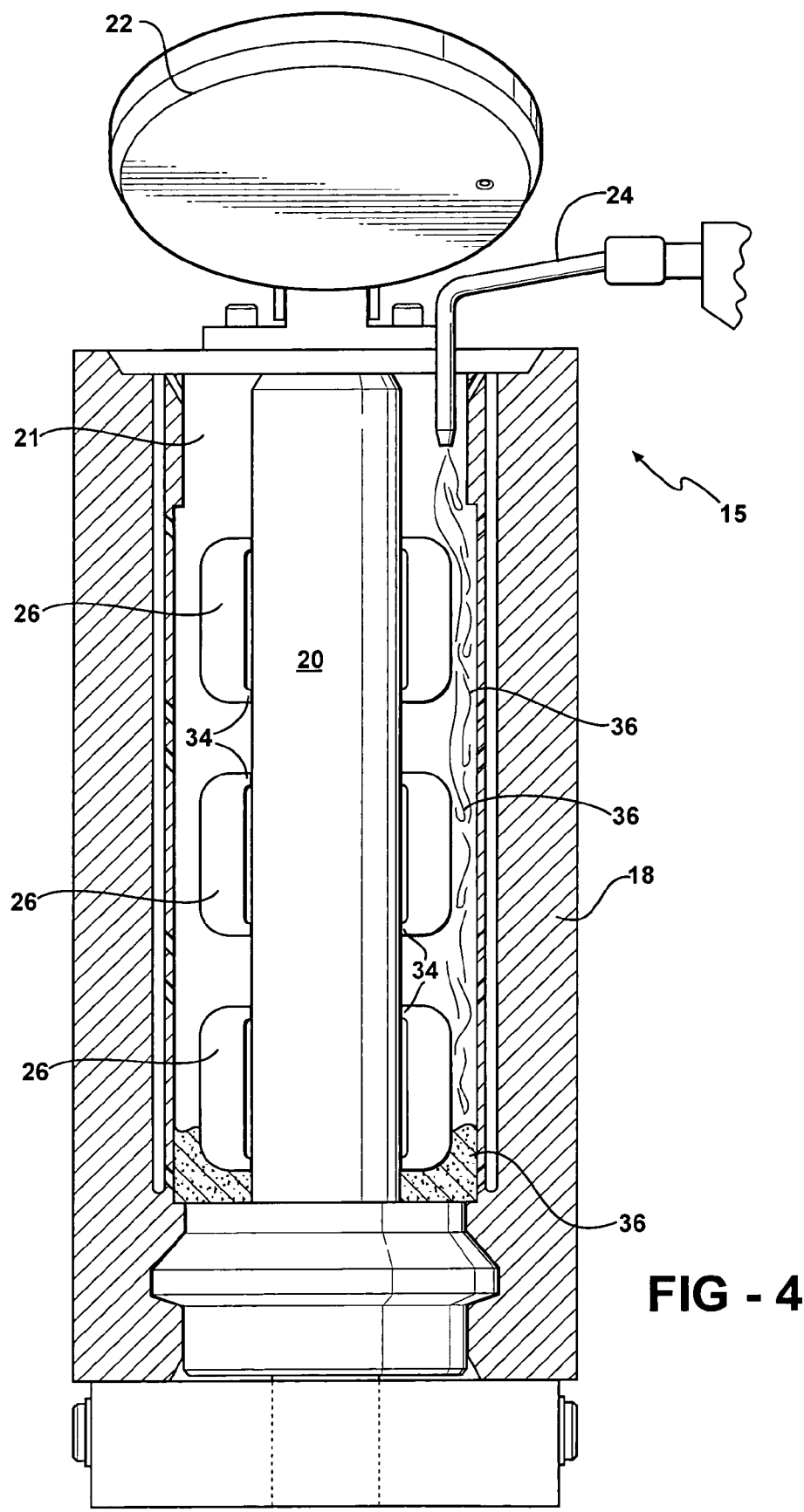
FIG. 4 is a partially cross-sectional elevational view of the molding assembly partially filled with a material.
Figure 5:
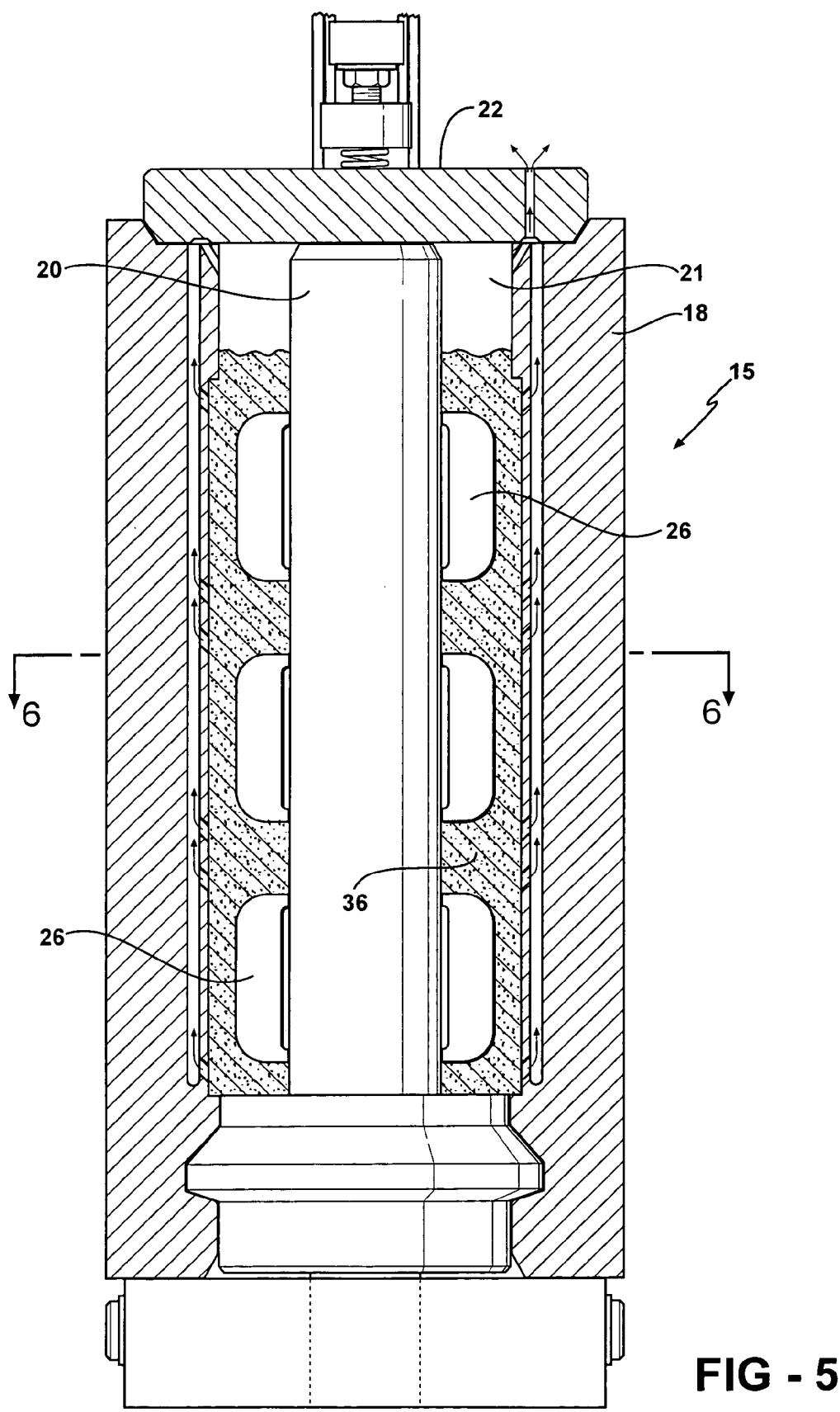
FIG. 5 is a partially cross-sectional elevational view of the molding assembly filled with the material.

Referring to FIGS. 1-5, a method of simultaneously forming a plurality of components utilizing the molding assembly 15 is now discussed in detail. As shown in FIG. 3, the method comprises the initial step of closing the mold halves 16, 18 about the inner core 20 to encapsulate the inner core 20 and define the mold chamber 21. As shown in FIGS. 4 and 5, the mold chamber 21 is then filled with a material 36 about the armatures 26 which at least partially encapsulates the armatures 26. Preferably, the material 36 is a elastomeric type material of a malleable composition, which will in turn create a malleable component. Even more preferably, the material 36 is micro-cellular polyurethane. It should be appreciated that the material 36 could be of any suitable composition that can be adequately cut.

The material 36 continues to fill the chamber 21 and encapsulate each of the armatures 26. As shown in FIG. 5, any air within the chamber 21 is allowed to evacuate out of the molding assembly 15 as the mold chamber 21 is filled with material 36. The pockets 32 formed between the neck 28 and enlarged 30 portions of the armatures 26 are also filled with the material 36 simultaneously during the step of filling of the mold chamber 21.

Figure 9:
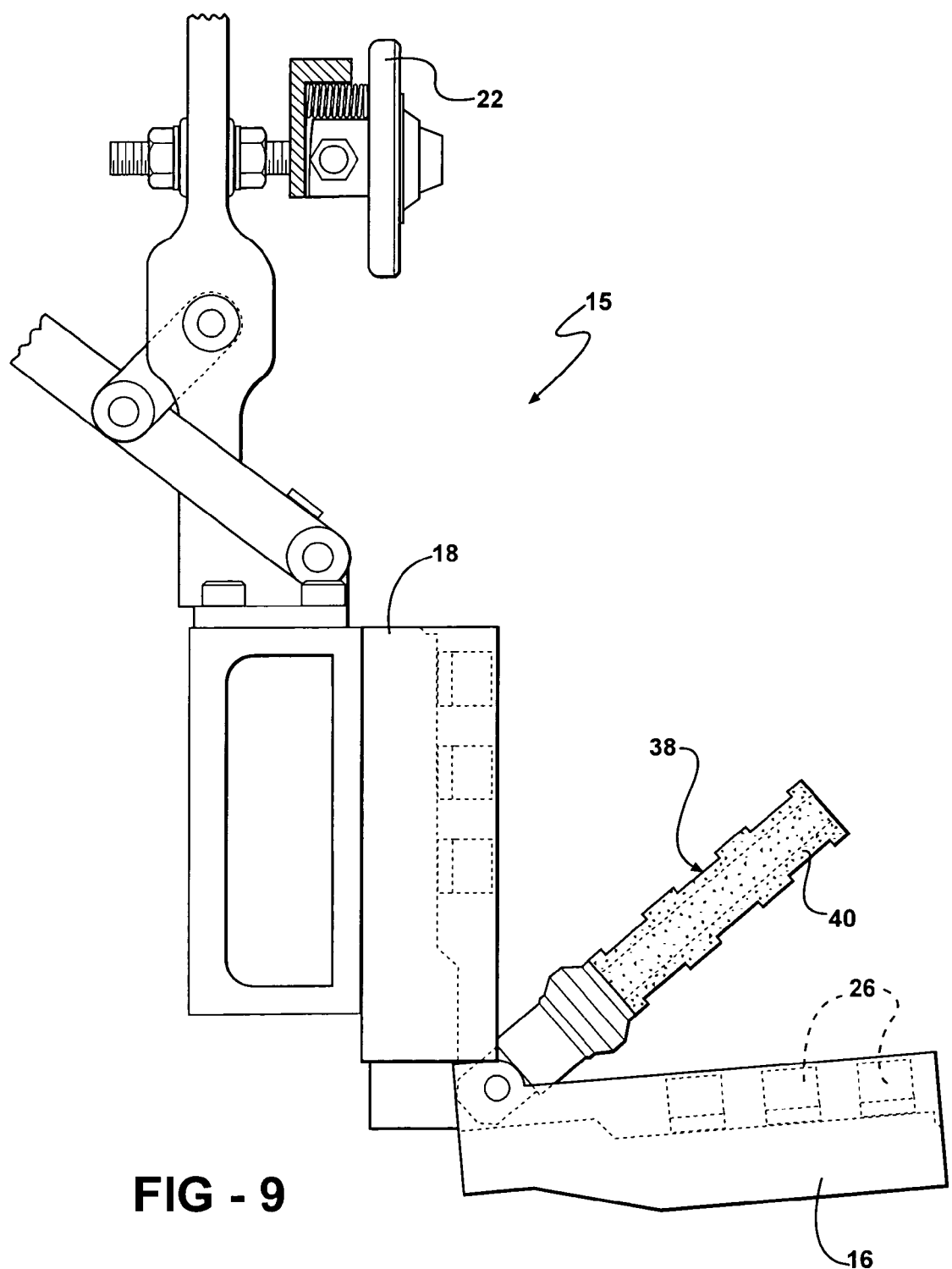
FIG. 9 is a side elevational view of the molding assembly in an open position after a molding operation has been completed.

The material 36 is then cured within the mold chamber 21 to create a stack of material 38 having an exterior surface 40 as shown in FIG. 9. The material 36 within the pocket 32 is simultaneously cured during the step of curing the material 36 within the mold chamber 21 which defines a trapped section 42 of the material 36 disposed within the pocket 32 as shown in FIGS. 6 and 7. Curing times and temperatures are known to those skilled in the art and will therefore not be discussed in any detail.

Referring to FIGS. 6-9, at least one of the mold halves 16, 18 now moves relative to the inner core 20 to open the mold chamber 21. As discussed above, preferably the first mold half 16 pivots relative to the second mold half 18. The inner core 20 will also pivot relative to the second mold half 18. The removal of the armature 26 from the stack of material 38 defines a cavity 44 disposed within the stack of material 38 and at least one opening 46 disposed in the exterior surface 40 (see FIGS. 7 and 10). The exterior surface 40 of the stack of material 38 is therefore discontinuous.

The trapped section 42 of the material 36 disposed within the pocket 32 is simultaneously manipulated during the removal of the armature 26 such that the stack of material 38 can be formed of a complex configuration. As best shown in FIGS. 7 and 8, the step of manipulating the trapped section 42 can be further defined as deflecting the trapped section 42 of the material 36 disposed within the pocket 32 during the removal of the armature 26. The step of manipulating the trapped section 42 could also be defined as compressing the trapped section 42 of the material 36 disposed within the pocket 32 during the removal of the armature 26. Further, the trapped section 42 of the material 36 disposed within the pocket 32 could be simultaneously deflected and compressed during the removal of the armature 26.

As shown in FIG. 9, the first mold half 16 and inner core 20 pivot sufficiently to provide access the cured stack of material 38. The stack of material 38 can now be removed from the inner core 20, which defines a center aperture 48 within the stack of material 38. The stack of material 38 is shown removed from the molding assembly 15 in FIG. 10 and is discussed in greater detail below.

Referring to FIGS. 6-10, the removing of the armature 26 preferably defines a base 52, 58, 64, 70 and at least one extension 54, 60, 66, 72 of the stack of material 38 to create the cavity 44 and opening 46. Even more preferably, the removing the armature 26 defines a pair of opposing bases 52, 58, 64, 70 and a pair of opposing extensions 54, 60, 66, 72 of the stack of material 38 to create the cavity 44 and opening 46. As discussed above, there are a plurality of armatures 26 on each of the mold halves 16, 18. Hence, the step of removing the armature 26 is further defined as removing each of the armatures 26 to define a pair of opposing bases 52, 58, 64, 70 and a pair of opposing extensions 54, 60, 66, 72 of the stack of material 38 to create the cavity 44 and opening 46. Even more preferably, each of the armatures 26 are removed to define a plurality of opposing bases 52, 58, 64, 70 and a plurality of opposing extensions 54, 60, 66, 72 of the stack of material 38 to create a plurality of separated cavities 44 and openings 46. The plurality of separated cavities 44 and openings 46 define the discontinuous exterior surface 40 of the stack of material 38.

Figure 10:
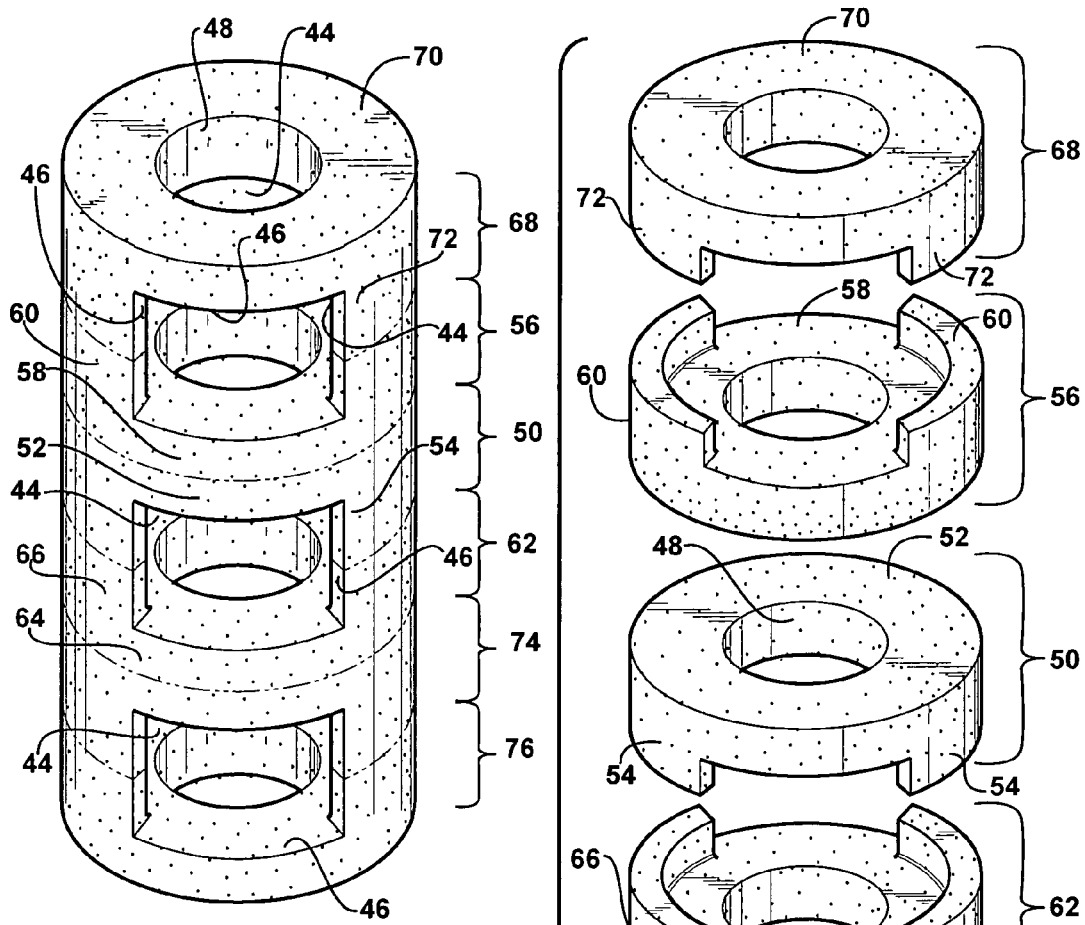
FIG. 10 is a perspective view of a stack of material.
Figure 11:
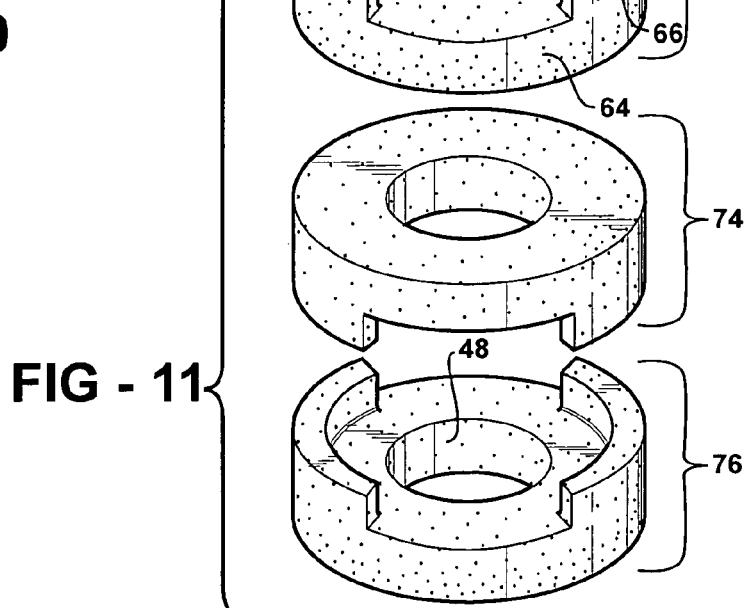
FIG. 11 is a perspective view of a plurality of components each having a common configuration.

The plurality of bases 52, 58, 64, 70, extensions 54, 60, 66, 72, cavities 44, and openings 46 of the stack of material 38 are preferably arranged in a particular repeating manner. As best shown in FIGS. 10 and 11, the stack of material 38, which is formed of the malleable composition, includes a first portion 50 having a first base 52 and at least one first extension 54 extending from the first base 52. Preferably, the center aperture 48 is formed in the first base 52 and there are a pair of first extensions 54. The stack of material 38 also includes a second portion 56 having a second base 58 complementary in configuration with the first base 52 and abutting the first base 52. The second portion 56 also has at least one second extension 60 extending from the second base 58 with the second extension 60 being complementary in configuration with the first extension 54. Preferably, the center aperture 48 is formed in the second base 58 and there are a pair of second extensions 60. The pair of second extensions 60 aligns with the pair of first extensions 54 and extends in an opposite direction from the first extensions 54. Also, the stack of material 38 includes a third portion 62 having a third base 64 complementary in configuration with the first base 52. The third base 64 is spaced from the first base 52 to define one of the cavities 44 within the stack of material 38 between the bases 52, 64. The third portion 62 also has at least one third extension 66 extending from the third base 64 with the third extension 66 being complementary in configuration with the first extension 54. The third extension 66 abuts the first extension 54 to define the stack of material 38. Preferably, the center aperture 48 is formed in the third base 64 and there are a pair of third extensions 60 abutting the pair of first extensions 54. The pair of third extensions 60 also aligns with the pair of first extensions 54 to define one of the openings 46 within the stack of material 38.

At least a fourth portion 68 having a fourth base 70 and at least one fourth extension 72 extending from the fourth base 70 is also provided. The fourth portion 68 is complementary in configuration with the first 50, second 56, and third 62 portions. The fourth base 70 is spaced from the second base 58 to define another one of the cavities 44 within the stack of material 38. It is preferred that the stack of material 38 have bases at opposing ends thereof. The fourth extension 72 aligns with the second extension 60 to define another one of the openings 46 within the stack of material 38. It should be appreciated that there may be any suitable number of additional portions having complementary configurations to the other portions. In fact, in the embodiment illustrated, there are also fifth 74 and sixth 76 commonly configured portions.

In the embodiment illustrated, the bases 52, 58, 64, 70 of the portions 50, 56, 62, 68, 74 are substantially circular and the extensions 54, 60, 66, 72 of the portions 50, 56, 62, 68, 74 are substantially curved about the circular bases 52, 58, 64, 70. Each of the bases 52, 58, 64, 70 are of a common thickness and each of the extensions 54, 60, 66, 72, are of a common height. Since the stack of material 38 is formed in a single manufacturing process, it is preferred that each of the portions 50, 56, 62, 68, 74, 76 are formed of a common homogenous material 36. As discussed above, the homogeneous material 36 is preferably a malleable material 36, such as micro-cellular polyurethane.

In summary, the plurality of portions 50, 56, 62, 68, 74, 76 are formed together on top of each other in a cylindrical-like fashion. In particular, each of the bases 52, 58, 64, 70 are formed together and each of the extensions 54, 60, 66, 72 are also formed together. The forming of the bases 52, 58, 64, 70 and extension 54, 60, 66, 72 are done in an alternating fashion such that multiple identical portions 50, 56, 62, 68, 74, 76 can be formed at the same time. As illustrated, there are six portions 50, 56, 62, 68, 74, 76 formed at the same time. Phantom lines are provided in FIG. 10 to indicate where the six portions 50, 56, 62, 68, 74 will be subsequently cut. Of course any suitable number of portions could be formed.

Turning to FIG. 11, the stack of material 38 is cut to transform the first 50, second 56, third 62, fourth 68, fifth 74, sixth 76, etc. portions into first 50, second 56, third 62, fourth 68, fifth 74, sixth 76, etc. components having a common configuration. For illustrative purposes, the components shown in FIG. 11 are given the same reference numerals as the portions shown in FIG. 10. In the broadest scope of the invention, the stack of material 38 is cut through the cavity 44 to form at least two components 50, 56, 62, 68, 74, 76 with each of the components 50, 56, 62, 68, 72, 74 having a common configuration. As illustrated, the stack of material 38 is cut five times to form the six components 50, 56, 62, 68, 74, 76 each having an identical configuration. Preferably, the step of cutting the stack of material 38 is further defined as cutting the stack of material 38 through the extension 54, 60, 66, 72 to form the components 50, 56, 62, 68, 74, 76. In the embodiment illustrated, the cutting is further defined as cutting the stack of material 38 through three different pairs of extensions 54, 60, 66, 72 and three different cavities 44 to form the plurality of components 50, 56, 62, 68, 74, 76 with each of the components 50, 56, 62, 68, 74, 76 having an associated pair of opposing extensions 54, 60, 66, 72. In the embodiment illustrated, the stack of material 38 is also cut through two different sets of bases 52, 58, 64, 70 to form the plurality of components 50, 56, 62, 68, 74, 76 with each of the components 50, 56, 62, 68, 74, 76 having a substantially similar base 52, 56, 64, 70 and pair of opposing extensions 54, 60, 66, 72 with one of the center apertures 48 formed within each base 52, 58, 64, 70. Preferably, the stack of material 38 is removed from the inner core 20 before the steps of cutting the stack of material 38.

Once cut, the six separated portions 50, 56, 62, 68, 74, 76 now form the six distinct components 50, 56, 62, 68, 74, 76. In the illustrated embodiment, the components 50, 56, 62, 68, 74, 76 are used as insulators for automotive body mounts, suspensions systems, or similar applications. In a suspension system, two of the insulators would be used in conjunction with each other to encapsulate a part and isolate this part from a surrounding system. The incorporation of these insulators into a suspension system is further disclosed and claimed in U.S. patent application Ser. No. 10/744,450, which is herein incorporated by reference.

The method of manufacture set forth above is particularly advantageous if the components 50, 56, 62, 68, 74, 76 are to be formed of micro-cellular polyurethane. As is known in the art, complex components, such as three dimensional components, formed of micro-cellular polyurethane are difficult to manufacture. The method described above reduces the difficulties of manufacturing a component, such as an insulator, of micro-cellular polyurethane by creating the single cylindrical-like stack and then subsequently cutting the stack into the pieces components. Also, multiple components are formed at the same time.

The invention has been described in an illustrative manner, and it is to be understood that the terminology which has been used is intended to be in the nature of words of description rather than of limitation. As is now apparent to those skilled in the art, many modifications and variations of the present invention are possible in light of the above teachings. It is, therefore, to be understood that within the scope of the appended claims the invention may be practiced otherwise than as specifically described.

What is claimed is:

1. A method of simultaneously forming a plurality of components utilizing a molding assembly having an inner core, a first mold half, and a second mold half with at least one of the mold halves including at least one armature, said method comprising the steps of:

closing the mold halves about the inner core to encapsulate the inner core and define a mold chamber;

filling the mold chamber with a material about the armature which at least partially encapsulates the armature;

curing the material within the mold chamber to create a stack of material having an exterior surface;

moving at least one of the mold halves relative to the inner core to open the mold chamber;

removing the armature from the stack of material to define a cavity disposed within the stack of material and at least one opening disposed in the exterior surface; and cutting the stack of material through the cavity to form at least two components with each of the components having a common configuration.

2. A method as set forth in claim 1 wherein the step of removing the armature to define the cavity and opening is further defined as removing the armature to define a base and at least one extension of the stack of material to create the cavity and opening.

3. A method as set forth in claim 2 wherein the step of cutting the stack of material is further defined as cutting the stack of material through the extension to form the components.

4. A method as set forth in claim 3 further including the step of cutting the stack of material through the base to form the components.

5. A method as set forth in claim 2 wherein the step of removing the armature to define the base and extension is further defined as removing the armature to define a pair of opposing bases and a pair of opposing extensions of the stack of material to create the cavity and opening.

6. A method as set forth in claim 5 wherein the step of cutting the stack of material is further defined as cutting the stack of material through the pair of extensions and the cavity to form at least two components with each of the components having a pair of opposing extensions.

7. A method as set forth in claim 6 further including the step of cutting the stack of material through the base to form the components with each of the components having a substantially similar base and pair of opposing extensions.

8. A method as set forth in claim 7 further including the step of removing the stack of material from the inner core to define a center aperture within the stack of material before the steps of cutting the stack of material.

9. A method as set forth in claim 1 wherein each mold half includes a corresponding armature and wherein the step of removing the armature to define the cavity and opening is further defined as removing each of the armatures to define a pair of opposing bases and a pair of opposing extensions of the stack of material to create the cavity and opening.

10. A method as set forth in claim 9 wherein each mold half includes a plurality of corresponding armatures and wherein the step of removing the armature to define the cavity and opening is further defined as removing each of the armatures to define a plurality of opposing bases and a plurality of opposing extensions of the stack of material to create a plurality of separated cavities and openings.

11. A method as set forth in claim 10 further including the step of removing the stack of material from the inner core to define a plurality of center apertures within the stack of material.

12. A method as set forth in claim 11 wherein the step of cutting the stack of material is further defined as cutting the stack of material through each of the cavities and openings to form a plurality of components.

13. A method as set forth in claim 12 further including the step of cutting the stack of material through each of the bases to form the plurality of components with each of the components having a substantially similar base and pair of opposing extensions with one of the center apertures formed within each base.

14. A method as set forth in claim 1 wherein the armature includes a neck portion and an enlarged portion which defines a pocket within the mold chamber and further including the step of filling the pocket with the material simultaneously during the step of filling of the mold chamber.

15. A method as set forth in claim 14 further including the step of curing the material within the pocket simultaneously during the step of curing the material within the mold chamber which defines a trapped section of the material disposed within the pocket.

16. A method as set forth in claim 15 further including the step of manipulating the trapped section of the material disposed within the pocket simultaneously during the removal of the armature such that the stack of material can be formed of a complex configuration.

17. A method as set forth in claim 16 wherein the step of manipulating the trapped section is further defined as deflecting the trapped section of the material disposed within the pocket during the removal of the armature.

18. A method as set forth in claim 16 wherein the step of manipulating the trapped section is further defined as compressing the trapped section of the material disposed within the pocket during the removal of the armature.

19. A method as set forth in claim 16 wherein the step of manipulating the trapped section is further defined as simultaneously deflecting and compressing the trapped section of the material disposed within the pocket during the removal of the armature.

* * * * *